United States Patent
Kapany, Narinder S.

[15] 3,682,553
[45] Aug. 8, 1972

[54] APPARATUS FOR ACQUIRING AND LAYING REAL TIME 3-D INFORMATION

[72] Inventor: Kapany, Narinder S., Woodside, Calif.

[73] Assignee: Optics Technology, Inc., Palo Alto, Calif.

[22] Filed: Sept. 19, 1968

[21] Appl. No.: 760,896

[52] U.S. Cl. .................356/4, 356/5, 178/6.5, 343/7.9, 352/86
[51] Int. Cl. ...........................................G01c 3/08
[58] Field of Search .....178/6.5, 7.6; 256/4, 6; 343/7, 343/7.9, 4, 5; 352/86; 350/96 B, 131

[56] References Cited

UNITED STATES PATENTS

| | | | |
|---|---|---|---|
| 2,361,390 | 10/1944 | Ferrill | 178/6.5 |
| 2,955,156 | 10/1960 | Heilig | 178/6.5 |
| 3,194,108 | 7/1965 | Günther | 356/6 |
| 3,246,330 | 4/1966 | Balding | 343/7 |
| 3,428,393 | 2/1969 | Montebello | 352/43 |
| 3,448,208 | 6/1969 | Chisnell et al. | 178/6.5 |

FOREIGN PATENTS OR APPLICATIONS 144,715  3/1949  Australia.............343/112 R Primary Examiner—Rodney D. Bennett, Jr.
Assistant Examiner—S. C. Buczinski
Attorney—Townsend and Townsend

[57] ABSTRACT

Apparatus for producing energy pulses of a sufficiently short duration that only a restricted zone of the target image is illuminated at any given instant. A gating apparatus is adapted to admit to a receiving apparatus a sequence of images from the target subject, each of which images corresponds to a different zone of the target subject. The receiving apparatus is coupled to a recording device that presents to the viewer a three-dimensional image of the target subject and that stores the image data for subsequent presentation. Several variations of the three-dimensional data acquisition and display devices are disclosed.

7 Claims, 8 Drawing Figures

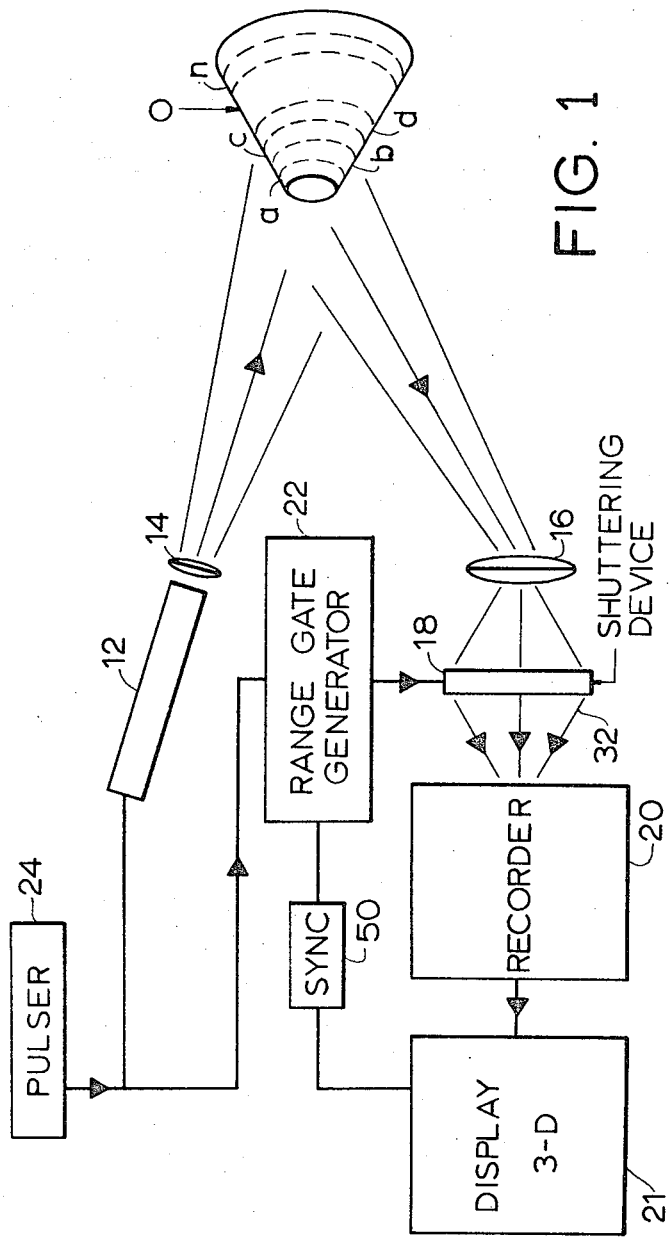
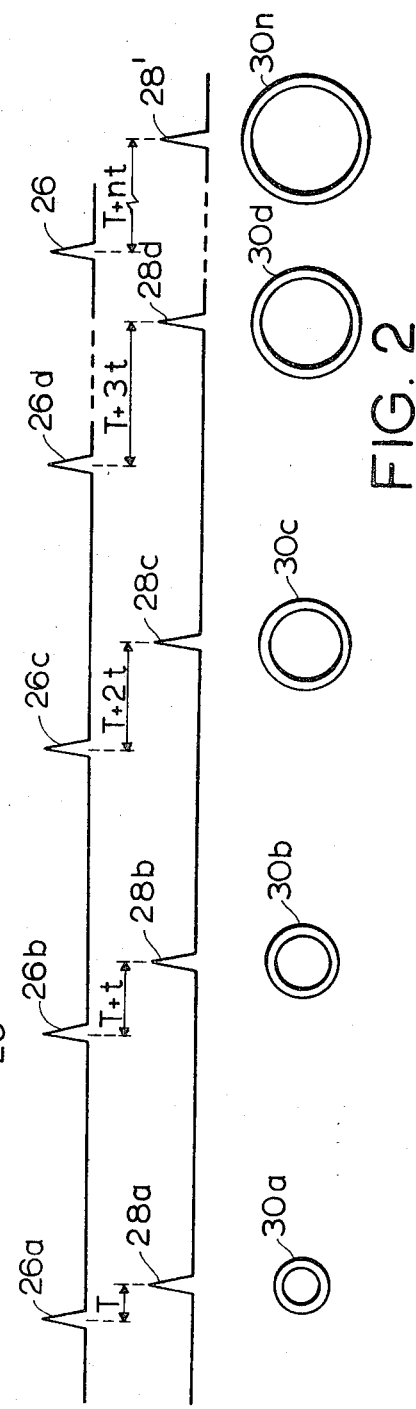

INVENTOR.
NARINDER S. KAPANY
BY Townsend and Townsend
ATTORNEYS

APPARATUS FOR ACQUIRING AND LAYING REAL TIME 3-D INFORMATION

This invention relates to apparatus for acquiring and displaying information regarding the shape and depth of a target subject. The invention affords acquisition and display of information in such manner that, to the viewer of the display system constituting part of the invention, the three-dimensional (3-D) character of the target subject is preserved.

An image of a solid target subject, i.e., a subject having depth, can be considered to be a composite of images of discrete juxtaposed zones, each of which zones is spaced a different distance from the viewer. In mathematic terminology, if the viewer is assumed to be positioned at the origin of a system of Cartesian coordinates, each such zone has specific X and Y characteristics within the bounds of different and discrete Z planes. The present invention provides for the sequential illumination of each zone by an energy source that can be pulsed to produce pulses that are extremely short with respect to the speed of propagation of the illuminating energy in the atmosphere or medium in which the target subject resides. For example, light travels through air at a rate $3 \times 10^8$ meters per second; a pulse of light of $1 \times 10^{-9}$ second duration is attainable by state-of-the-art techniques and will illuminate, at a given instant, a zone on the target subject that has a Z dimension of 0.3 meter, or about 1 foot. The present invention also provides apparatus for identifying each such zone as it is illuminated so that a plurality of images of such zones can be combined to produce a composite image. Finally, the present invention provides a display device for creating an accurate 3-D display of the composite image of the target subject.

Information necessary for production of a 3-D presentation is acquired in the form of a sequence of image frames that are spaced apart from one another in the time domain. In the first instance, the individual frames are acquired by illuminating the object with a very short duration energy pulse, and by providing a viewing or receiving device that can be pulsed on and off by an equally short pulse. The shortness of the pulse determines the depth resolution of the system, a light pulse of one nanosecond duration providing a depth resolution in the atmosphere of approximately 1 foot, and a pulse width of one picosecond duration providing a system with a depth resolution in the atmosphere of approximately 0.01 inch. The time duration of each individual image is sufficiently short that plural images can be combined to create a composite image that is free of flicker.

An object of this invention is to provide apparatus for acquiring a clear image of a target subject irrespective of the presence of interfering matter, such as fog or dust, between the apparatus and the target subject. In atmospheres containing fog or dust, backscatter of light from the fog or dust, as well as the opacity of the fog or dust, obscures the target from clear view because such backscatter dazzles the viewer. The stated object is achieved according to the present invention by acquiring images of only those Z planes that contain the target subject but rejecting images of those Z planes that contain nothing but dazzling backscatter from the fog or dust.

Another object is to provide an apparatus and a method in which the Z distances between the various images acquired can be varied or adjusted to introduce nonlinearities, thereby to eliminate or ameliorate depth distortion, or to emphasize or magnify one specific Z region of the target subject. According to the present invention, the distances between the images of adjacent Z planes are proportional to the time intervals between the formation of the respective images. Such time intervals can be varied and controlled simply and accurately, as a consequence of which distortion elimination or selective minification or magnification can be accurately and simply effected.

The above stated object is advantageously employed to compensate for depth distortions arising from the fact that the degree of magnification in an optical system bears an inverse square law relationship to distance. Without compensation, near zones of a target subject are magnified by a greater degree than are remote zones of the target subject. This phenomenon is particularly noticeable when the target subject is very near the optical system. The present invention affords amelioration of this problem because it develops a unique image for each Z plane and such images corresponding to near zones of a target subject are magnified to a lesser degree than images corresponding to remote Z plane zones of the same target.

Still another object of the present invention is the provision of a display device that presents to the viewer an image of the target that appears in a truly three-dimensional aspect. The display device presents images of zones of a target subject at different real distances or at different apparent distances from the viewer's eyes, thereby achieving the 3-D effect.

Yet another object of the present invention is to provide a display apparatus capable of displaying, in 3-D form, images of either a previously acquired real target subject or a subject that has been calculated from analytical or abstract computer-generated data. This object can be achieved because the apparatus of this invention is capable of presenting to the viewer for simultaneous viewing images of plural Z planes of the target subject. Because the apparatus is capable of integrating plural images, it is useful for displaying stored data, such as data from a magnetic tape or like memory device.

A further object of the present invention is to provide a system that can be adapted for image acquisition in substantially any medium by changing the frequency of the energy pulses employed. Thus in the atmosphere energy sources in the radar or visible bands of the spectrum can be employed to advantage, and in a medium such as water the sonic or audio bands of the spectrum can be used to advantage.

Other objects, features and advantages of the present invention will be more apparent after referring to the following specification and accompanying drawings in which:

FIG. 1 is a diagrammatic view of a system according to the present invention;

FIG. 2 is a timing diagram showing the time relationship of various pulses employed during operation of the system of FIG. 1;

Figure 3:
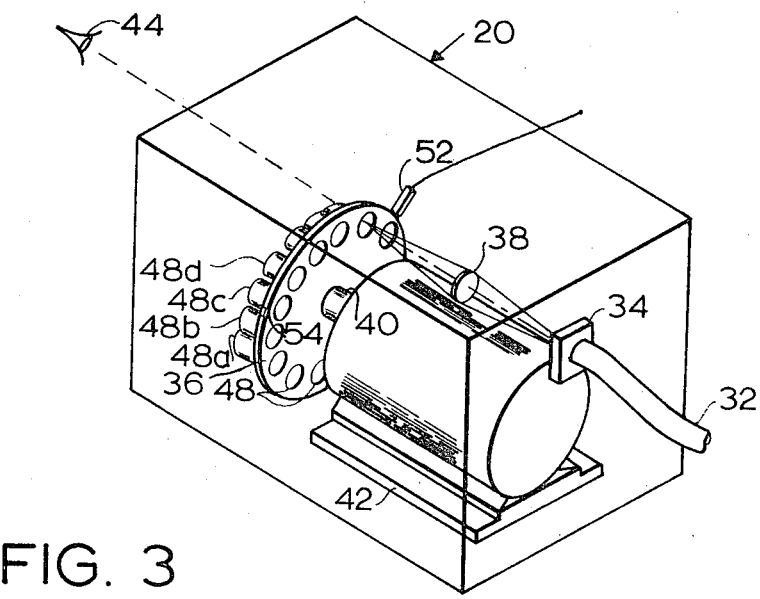
FIG. 3 is a perspective view of one form of mechanical display device according to the present invention.

Referring more particularly to the drawings, reference numeral 12 indicates a source of wave energy such as a laser, the output of which is aimed by an optical system 14 at a target subject O. An optical system 16 is fixed with respect to optical system 14 so as to be adapted to receive energy from source 12 that is reflected by target subject O. Such energy is imaged by the optical system onto a shuttering device 18, which device, when opened, admits the image to a recording device 20.

In the context of the present patent application, it is to be understood that recorder 20 can be any device that records, whether momentarily or permanently, the image gated to it through shuttering device 18. Thus, according to the broad meaning intended to be given to the element described and claimed as "recorder" herein, such recorder can be a lens system for instantaneously transferring the image from shuttering device 18 to a display device 21 or it can be a storage or recording device such as magnetic core, magnetic tape, or the like.

A range gate generator circuit 22 is operatively connected to shuttering device 18 to control the time and duration that the shuttering device is opened. In the preferred form of the present invention, the gate generator circuit 22 is adapted to open shuttering device 18 for a duration that is short with respect to the time required for an energy pulse from source 12 to advance a given distance along target subject O. The shorter the duration of opening shutter device 18, the higher the degree of resolution achievable by the apparatus of the invention.

Energy source 12 is periodically activated by a pulser circuit 24; a trigger signal is produced by pulser 24 and is connected to a gate generator circuit 22. Gate generator circuit 22 is adapted to generate gate pulses at predetermined delay intervals after each pulse from pulser 24 so that a different segment of target subject O will be transferred into recording apparatus 20 for each complete signal generated by generator circuit 22.

In one system designed according to the present invention, optical system 14 is designed to constrain the output of energy source 12 to an angle approximately $20 \times 10^{-3}$ radians, which at 1 kilometer produces an image into optical system 16 that encompasses an angle of $0.3 \times 10^{-3}$ radians. With such system it is possible to detect $10^3$ elements of information in each of the horizontal and vertical directions. Such system operates at an average laser power of 1 watt, a peak laser power of $10^5$ watts, and an energy per pulse of $10^{-1}$ joule.

A full equivalent to the structure and mode of operation described above is opening and closing of shuttering device 18 a plurality of times in rapid succession for a single pulse from energy source 12. Each occasion that the shuttering device is open effects transference of a discrete Z plane image to recording apparatus 20.

In order to achieve an appropriate gate signal from gate generator circuit 22, the generator is arranged to produce a gating signal at a time that is delayed by a variable amount from the time of the pulse from pulser 24. State-of-the-art techniques for achieving such delay in a programmable manner include: optical, distributed constant variable delay line, dual sawtooth electronic delay, and tapped delay line gated sequentially.

With reference to FIG. 2, the output of pulser 24 is indicated by uniformly repetitive pulses 26. The first of a sequence of gate pulses is a pulse 28a, which is generated at a time T after generation of the pulse from pulser 24 which initiates the energy pulsed from energy source 12. The opening of shuttering device 18 by gate pulse 28a occurs at a time when segment a (see FIG. 1) of target subject O has been illuminated by energy source 12. Accordingly, the image formed by optical system 16 onto recording device 20 corresponds to segment a, such image being indicated at 30a in FIG. 2.

The succeeding pulse from energy source 12 occurs at a time indicated at 26b in FIG. 2. When the energy source 12 is activated by pulse 26b, gate generator circuit 22 is correspondingly activated, and at an interval of time later, namely T+t, a gate signal 28b is generated. Gate signal 28b occurs at a time with respect to pulse 26b that is t units of time later than the interval between pulses 28a and 26a. Gate pulse 28b opens shuttering device 18 to effect formation of an image on recording device 20 that is shown at 30b and indicated diagrammatically at b in FIG. 1.

The next succeeding pulse produced by pulser 24 is designated as 26c in FIG. 2. When such pulse occurs, energy source 12 is activated and transmits a pulse of wave energy toward target subject O. At a time equal to T+2t after the occurrence of pulse 26c, gate circuit 22 produces a gate pulse 28c. Such pulse gates through to the recording device 20 an image schematically depicted at 30c in FIG. 2 and indicated on target subject O in FIG. 1 as c. Subsequently, a pulse 26d occurs and initiates generation of a gate pulse 28d which occurs T+3t units of time after pulse 26d. Consequently, segment d of target subject O is imaged onto recording device 20, the image resembling the schematic representation at 30d in FIG. 2. Subsequent pulses 26 from pulser 24 occur to generate a sequence of gate pulses up to 28' (the nth discrete gate pulse) which is delayed from the pulse 26 that initiates it by T+nt units of time. It will be seen that the present system produces n discrete images corresponding to different portions of target subject O and each of the images corresponds to a different depth dimension of target subject O. Also included as an element in the present invention is a device 21 for displaying the images in such way as to produce to the user of the apparatus a real time 3-D view.

Referring to FIG. 3, a 3-D display device 21 is coupled to shuttering device 18 (not shown in FIG. 3) via a fiber-optic bundle 32. The outlet end of the bundle is fixed at 34 in confronting relation to the rear face of a disk 36, a lens system schematically indicated at 38 being interposed between the fiber-optic bundle and the disk to form an image on the disk. Disk 36 is secured to the shaft 40 of a motor 42, which motor is energized so as to rotate disk 36 when 3-D viewing is taking place. Opposite the front face of disk 36 is a viewing station 44 in alignment with lens 38 and with a segment of disk 36 adjacent to and inward of the outer periphery.

Disk 36 has mounted around the periphery thereof, at equally, radially and circumferentially spaced intervals, a plurality of fiber-optic bodies 48. The rear faces of the respective fiber-optic bodies are disposed in mutually coplanar relationship, The front faces of the fiber-optic bodies, however, are spaced from viewing station 44 by different amounts since the fiber-optic bodies have different lengths. Accordingly, a fiber-optic body 48a will produce an image that appears closer to a viewer at station 44 than will a fiber-optic body 48b which is slightly shorter than the former fiber-optic body. Fiber-optic body 48c is in turn shorter than fiber-optic body 48b and fiber-optic body 48d is shorter than fiber-optic body 48c. Consequently, by synchronizing the rotation of wheel 36 with the gating of the images 30 (FIG. 2), a real time 3-D view of target subject O is afforded a viewer peering into the apparatus from viewing station 44.

The synchronization is achieved in part by providing a link between viewing device 21 and the gate generator circuit 22, such link being designated schematically in FIG. 1 at 50. A suitable synchronizing link is constituted by an electromagnetic pickup head 52 disposed adjacent the periphery of disk 36 and an iron slug 54 located in the periphery of the disk to induce in the pickup head 52 an electric signal each time disk 36 makes one revolution.

In the specific disk shown in FIG. 3 there are 16 fiber-optic bodies 48. Rotation of disk 36 at such rate as to present approximately 20 views per second for each image (that is, for each value of $n$) produces a 3-D substantially steady view of target subject O. Accordingly, if each of the fiber-optic bodies on disk 36 corresponds to one discrete magnitude of $n$, rotation of the disk at a speed of 20 revolutions per second will produce an accurate 3-D image of target subject O.

Because of the presence of synchronizing link 50 the speed of rotation of disk 36 is not critical. Moreover, the synchronization link permits adaptation of the viewing device of FIG. 3 to reproducing, in 3-D form, information that has been stored on tape, film, or other storage media.

The relative lengths of the individual fiber-optic bodies 48 can be established in a nonlinear relationship to the Z planes to which the respective bodies correspond. The precise relationship can be used to magnify selectively a given Z plane region of the target to avoid the depth distortion alluded to above, or to achieve virtually any other depth alteration desired.

To effect further compensation for depth distortion, some of the fiber-optic bodies 48 can be formed so that the output faces (front faces) are sufficiently larger than the input faces (rear faces) that the images viewed from viewing station 44 through such bodies is larger than the image formed on the input face of the body. Appropriate degrees of divergence of the fibers and appropriate lengths of fibers in those bodies 48 that correspond to the rear or remote segments of the target will permit greater relative magnification of such remote images than of the images of the front or near segments of the subject. Thus distortion arising from the square law relationship between degree of magnification and target range is remedied.

Figure 4:
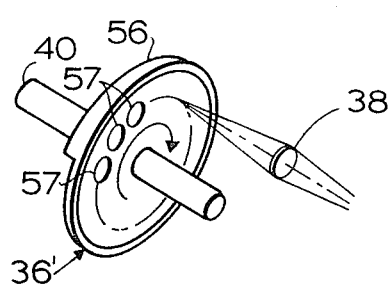
FIG. 4 is a modification of a portion of the apparatus of FIG. 3.

FIG. 4 shows a modification of the disk 36 of FIG. 3, the disk of FIG. 4 being designated by 36'. Supported on one face of the disk is a single body of optical fibers that is wedge-shaped in a peripheral or circumferential sense so as to define a helical viewing face 56. Circular regions 57 are shown in FIG. 4 to indicate that disk 36' can be used interchangeably with disk 36; the circular regions are not structurally different from the balance of the helical fiber-optic body, as a consequence of which a different number of images can be displayed on a device employing disk 36'. Although the structure of FIG. 4 is somewhat more difficult to fabricate than disk 36 in FIG. 3, the continuous surface 56 has the advantage of adapting the device to different values of $n$, that is, different numbers of depth increments on target subject O that are viewed. Such variation is achieved without structural variation of the apparatus, needed variations being achieved by appropriate adjustments of pulser 24 and gate generator circuit 22.

Figure 5:
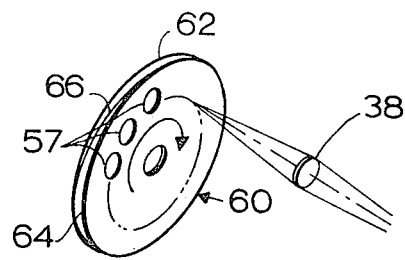
FIG. 5 is a view of another modification of a portion of the apparatus of FIG. 3.

Still another modification is shown in FIG. 5. The disk 60 in FIG. 5 is formed of two transparent elements 62 and 64 that have different indices of refraction. The two elements are shaped to define centrally of the disk a helical interface 66. Thus at different circumferential locations around the disk, the image formed on one face of the disk will appear closer to or farther from the viewer in accordance with the location of the interface with respect to the surface. Disk 60 has the advantage mentioned hereinabove with respect to the device of FIG. 4, namely: the number of images formed about the periphery of the disk can be readily varied without mechanical adjustment of the apparatus.

Figure 6:
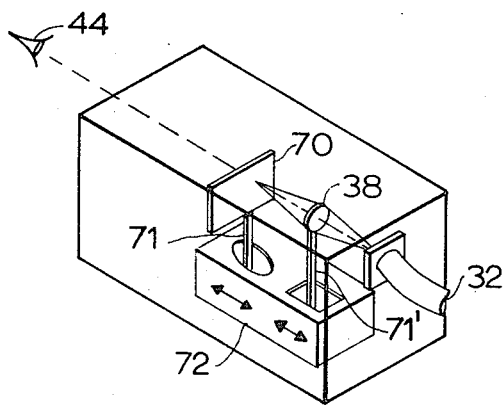
FIG. 6 is a perspective view of still another form of a 3-D viewer of the invention.

FIG. 6 shows yet another modification of the viewing apparatus of the invention. In FIG. 6, a screen, such as a frosted glass screen 70, is supported for movement toward and away from a viewing station 44 by an oscillating bar 71 that is moved in oscillatory motion toward and away from the viewing station by an actuator 72. Lens 38 is carried by an auxiliary oscillating bar 71' that moves the lens in synchronism with screen 70. One excursion of screen 70 corresponds to one revolution of disk 36 referred to above so that the sequence of images seen by the viewer of the apparatus of FIG. 6 is similar.

Figure 7:
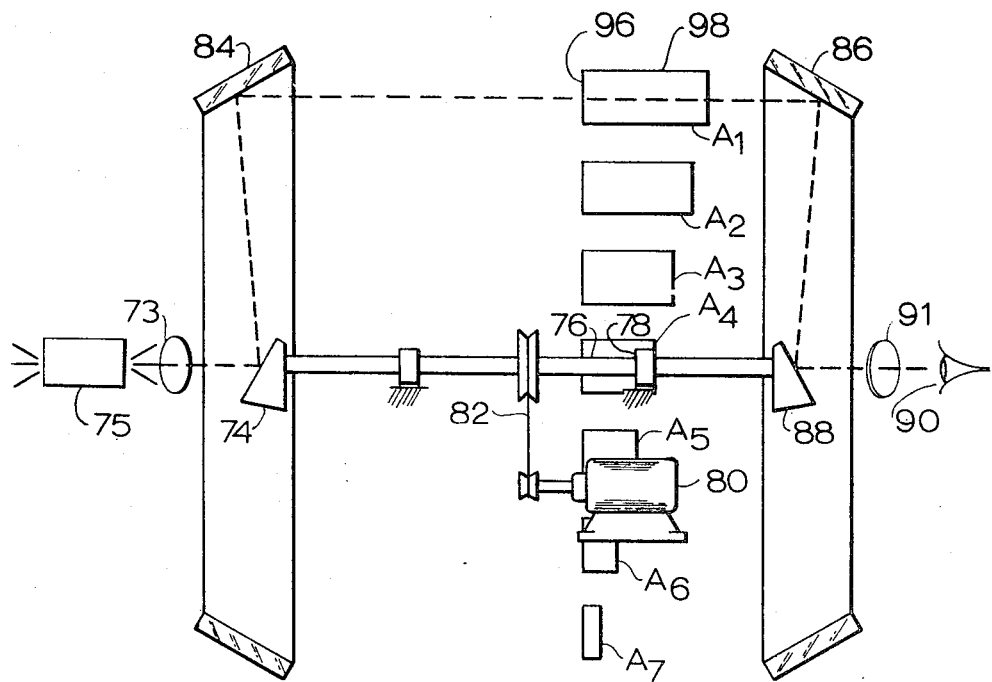
FIG. 7 is a view of yet another form of the 3-D viewer.

Another form of viewer is shown in FIG. 7. The optical input to the viewer is by way of a lens 73 in optical alignment with a mirror 74. Mirror 74 is mounted on a shaft 76 that is supported for rotation by bearings 78. The optical image is periodically gated to lens 73 and mirror 74 by interposition of an opto-electric image intensifier tube 75 in the optical path to lens 73. A motor 80 is provided for driving shaft 76 through a suitable drive train 82. Spaced in a circle concentrically of the axis of shaft 76 is a frusto-conical reflector 84 which is constructed and arranged to reflect an image from mirror 74 along a locus of parallel optical paths that reside in an imaginary cylinder concentric with the axis of shaft 76. Axially spaced from reflector 84 is a similar reflector 86 that is constructed and arranged to reflect the image to a centrally located mirror 88 for display to an observer at 90 through a lens 91. Reflector 88 is coupled to shaft 76 for rotation therewith.

Spaced intermediate of reflectors 84 and 86 and within the above mentioned optical paths is a plurality of input faces 96 of plural fiber-optics bodies 98. The fiber-optics bodies 98 have different lengths in accordance with the description given hereinabove with respect to FIG. 3 and specifically fiber-optics bodies 48. Accordingly, the image displayed to the viewer at 90 by reflector 88 will appear to move toward and away from the viewer as shaft 76 is rotatably driven and as different images corresponding to images 30 in FIG. 2 are projected onto input mirror 74. Appropriate synchronization signals applied to image intensifier 75 achieve formation of appropriate images on respective fiber-optics bodies 98 so as to provide a non-flickering 3-D image.

Figure 8:
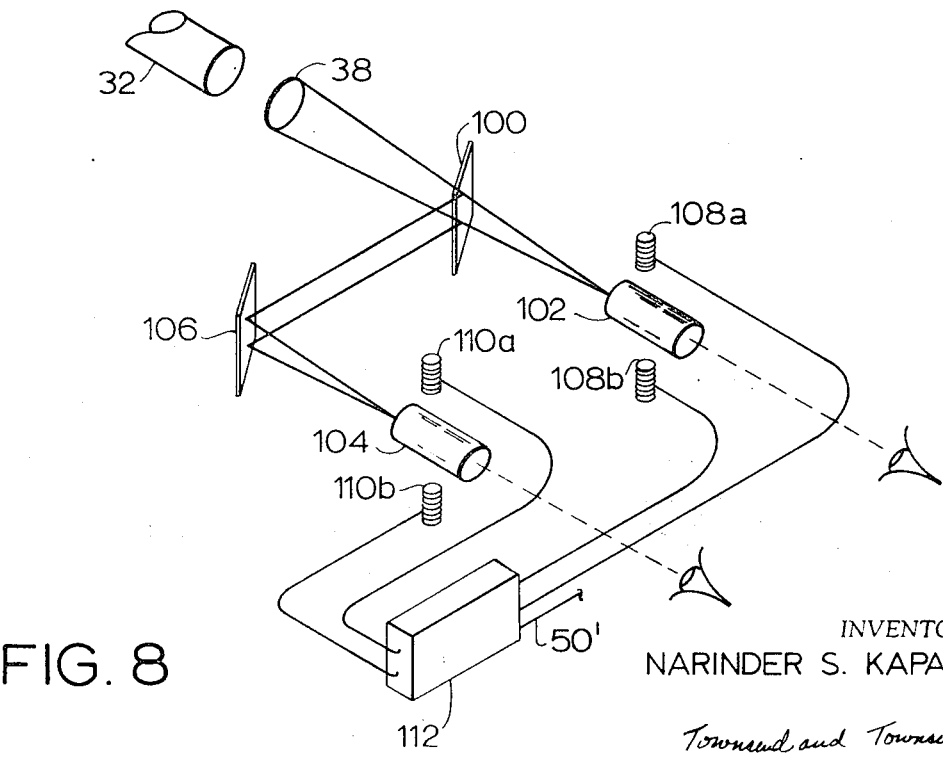
FIG. 8 is a view of still another form of viewer.

FIG. 8 depicts a 3-D viewing device that generates plural images in a single plane. By providing apparatus that exploits stereopsis, or the characteristic of stereoscopic vision in human eyes, an apparent 3-D presentation is afforded. Identical but separate images of a target subject are formed for the right and left eyes of the viewer, and such images are caused to move toward and away from one another in proportion to the range of the target subject. The viewer will observe the distance between the images, and plural images at different distances will be interpreted by the brain of the viewer as a 3-D image.

The specific structure depicted in FIG. 8 is but one of the numerous techniques for positioning the images in proportion to the range that will occur to those skilled in the art. In FIG. 8, a sequence of images is focused by lens system 38 from an image input such as a fiber-optic bundle 32 onto an image splitter 100. The image splitter 100 forms two identical images, one of which is formed on the input screen of an image intensifier tube 102 and one of which is formed on the input screen of image intensifier 104, the latter requiring an auxiliary reflector 106. The outputs of image intensifier tubes 102 and 104 are spaced from one another by an amount appropriate for binocular viewing. The image intensifier tubes 102 and 104 are conventional devices that first convert photons to electrons at the input thereof, then accelerate the electrons while preserving their respective spatial relation, and finally reconvert the electrons to photons at the output so as to provide a more intense image than appeared at the input. The electrons within the tubes 102 and 104 are deflected laterally in accordance with the present invention by opposed deflection coils 108a and 108b in association with image intensifier 102 and by opposed deflection coils 110a and 110b in association with image intensifier 104.

The deflection coils are coupled to a programmable signal source 112 which includes a feedback link 50' for operative connection with gate generator 22. A variation of the apparatus of FIG. 8 is a device having reflectors 100 and 106 mounted on individual galvanometer devices which act to position the images in accordance with the magnitude of voltage applied to the coils of the galvanometer. Such voltage, if made proportional to range, will position the images at appropriate positions in accordance with the range of the target subject.

The operation of the apparatus of FIG. 8 can be understood by considering the characteristic of the human eye known as stereopsis or stereoscopic vision. That is to say, duplicate images that are relatively close to one another in a binocular viewing device will appear nearer to the viewer than duplicate images which are separated from one another. The magnetic fields occurring across the deflection coil pairs, for example, deflection coils 110a and 110b, deflect the electrons within image intensifier tube 104 by an amount corresponding to the strength and polarity of the field created by the coils. Gate circuit 22 and signal source 112 are adapted to coact through link 50' to produce in the respective deflection coil pairs a field of strength and polarity corresponding to the range of the particular target segment displayed. Thus if the deflection coils 110a and 110b are energized so as to form an image on tube 104 that is toward image tube 102, and if deflection coils 108a and 108b are energized so as to form an image on image tube 102 that is toward image tube 104, the viewer, when looking at both image intensifier tubes and the images formed thereon, will perceive that the target subject is relatively close. On the other hand, if the images are formed on the sides of the image intensifier tubes remote from one another, the viewer will perceive the target subject as being relatively farther away. In accordance with established circuitry techniques, the deflection control device 112 energizes coils 108a and 108b 110a and 110b to achieve such positioning of the respective images, and the amount of deflection to which the images are subjected corresponds to the value of $n$ in FIG. 2.

The specific target subject O shown in the drawings is a frustum of a solid cone; this exemplary target subject is used, not to limit the invention, but merely as a convenient 3-D target to illustrate the operation and features of the invention.

It will thus be seen that the present invention provides a system for acquiring and displaying 3-D information concerning a target subject. The display is in a real time domain so as to afford the viewer a realistic representation of the subject matter being viewed. Although the system of FIG. 1 provides an immediate display of the target subject O, it will be obvious that the information can be stored, as on magnetic tape or the like, and can be subsequently displayed. Thus recorder 20 is intended to exemplify apparatus that transmits images supplied thereto to display device 21 as well as memory or storage devices such as tapes, films, and the like. Moreover, the input to the display device generally indicated at 21 in FIG. 1 can be either directly from a target, as shown in FIG. 1, from previously stored data, or from information derived analytically through a computer or drawn up according to available data or artistic concepts. Thus the system is useful in affording accurate visualization of synthetic or hypothetical subjects as well as of real target subjects.

Although several embodiments of the invention have been shown and described, it will be apparent that other adaptations and modifications can be made without departing from the true spirit and scope of the invention.

What is claimed is:

1. Apparatus for acquiring data that define the outline and range of a target subject comprising a source of wave energy, means for forming pulses of the energy at plural range locations on the target subject so that the plural range locations are sequentially illuminated by energy from said energy source to form outlines of each range zone, means for receiving the energy pulses from the target subject, means for sequentially gating each of the energy pulses received so that a sequence of outline images at discrete range distances is formed, and means for sequentially visually displaying the output of said gating means, said displaying means including an optical system that produces images corresponding to the image received by said receiving means, said displaying means being adapted to produce images at a number of apparent distances from the viewer that is equal to the number of discrete range gate pulses and having an equal number of means that form image producing faces, the apparent distance of each particular image producing face corresponding to the range of the target zone represented by the particular image.

2. The invention of claim 4 wherein said displaying means comprises a viewing station, a circular disk having a face confronting said viewing station, means for rotatively driving said disk about the central axis thereof, said axis being approximately normal to said face and being spaced relative said viewing station such that an annular region of said disk face sweeps past said viewing station in response to rotation of said disk, means for forming on the annular region of said disk face a plurality of optical imaging surface regions, each said surface region being spaced from said viewing station by a different amount so that images on said surface regions that are in alignment with said viewing station will appear at different distances, means in alignment with said viewing station for producing on said surface regions a sequence of images of different range segments of the target body, and means for synchronizing the rotation of said disk with said image producing means so that the range segment of the target corresponds to the distance of the imaging surface portion at the instant that the surface portion is in alignment with the viewing station.

3. Apparatus according to claim 2 wherein said surface region forming means comprises a plurality of fiber-optic bodies mounted on said disk about the periphery thereof, said body having a front face adjacent said viewing station and a rear face remote from said front face, said rear faces being in mutually coplanar relationship and being adapted to transmit an image from said image forming device to the front face thereof to form an image on the front face, each said fiber-optic body having a length inversely proportional to the range distance of the image produced on it by said image producing means.

4. Apparatus according to claim 2 wherein said surface region forming means comprises a body of optical fibers disposed on said disk, said body having a plane rear annular face and a helical front annular face opposite said viewing station.

5. Apparatus according to claim 2 wherein said surface region forming means comprises a body of optical fibers disposed on said disk, said body being formed by a plurality of arcuate segments the totality of which form a generally annular body concentric with said disk, said segments having mutually coplanar rear faces, each said segment having a front face parallelly spaced from the rear face thereof by a different discrete distance, whereby the front face of the surface region forming means is of generally arcuately stepped configuration.

6. Apparatus according to claim 2 wherein said surface region forming means comprises an annular body of transparent material secured to said disk, said body having a front face and a rear face parallel to said front face, said annular body being formed by two segments of transparent material that have different indices of refraction, each said segment having a helical surface, said helical surfaces being in intimate contact to define a helical interface therebetween, said interface being intermediate said front and rear surfaces.

7. A viewing device having an objective lens that is arranged to be viewed along a path coterminous with the optical axis thereof, a first reflector disposed on said axis, means for rotating said first reflector about said axis so that a first circular path concentric with said axis is scanned as said first reflector is rotated, first reflecting means disposed in said first circular path for reflecting images from said first reflector, second reflecting means spaced from said first reflecting means for reflecting images impinging thereon from said second reflecting means toward said axis, a second reflector disposed on said axis for establishing an optical path from said second reflecting means from an input disposed along the said axis, said second reflector being coupled to said rotating means so that said first and second reflectors rotate in unison, a plurality of fiber-optical bodies disposed intermediate said first and second reflecting means so that a reflected image revolving between said first and second reflecting means in response to rotation of said rotating means will sequentially pass through said bodies, said bodies having different lengths and having the ends thereof that are adjacent the said first reflecting means disposed in coplanar relationship so that the images reflected toward said viewing device appear to be formed at different ranges, and means for synchronizing the range of each image with the rotative position of said first and second reflectors so that the range of an image is inversely proportional to the length of a particular said fiber-optic body through which each image is reflected.

* * * * *